March 2, 1965   R. B. KOCH   3,171,446
FLUID DISPENSER AND CONTAINER
Filed Feb. 11, 1963   2 Sheets-Sheet 1
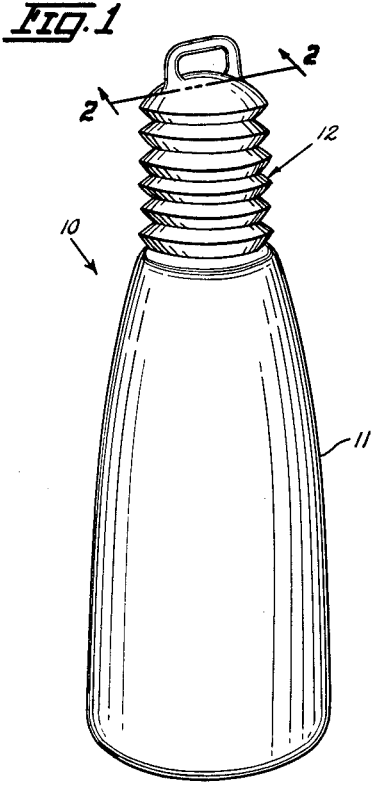
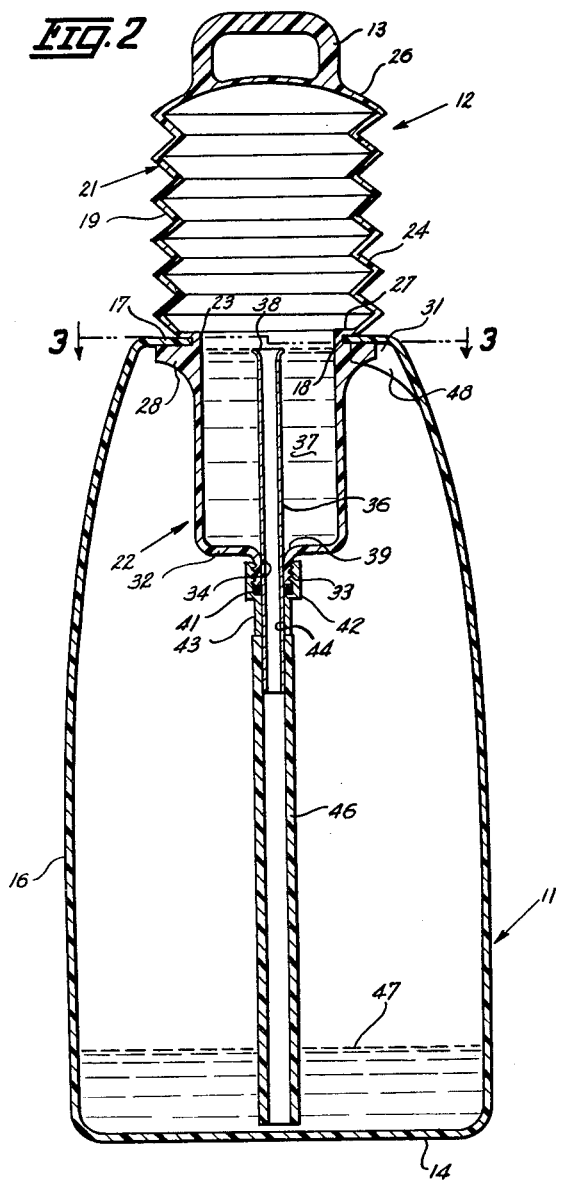
INVENTOR.
ROBERT B. KOCH
BY
ATTORNEY.

March 2, 1965

R. B. KOCH 3,171,446

FLUID DISPENSER AND CONTAINER

Filed Feb. 11, 1963

INVENTOR.
ROBERT B. KOCH
BY
Rudolph L. Lowell
ATTORNEY.

United States Patent Office 3,171,446
Patented Mar. 2, 1965

3,171,446
FLUID DISPENSER AND CONTAINER
Robert B. Koch, Detroit, Mich., assignor to The Delman Company, Cookeville, Tenn., a corporation of Tennessee
Filed Feb. 11, 1963, Ser. No. 257,593
5 Claims. (Cl. 141—24)

This invention relates to a fluid container and dispenser assembly and more particularly to a liquid dispensing unit having a collapsible and expandable pump for withdrawing a predetermined amount of liquid from an associated container.

It is the object of the present invention to provide an improved fluid dispensing unit.

Another object of the invention is to provide a fluid dispensing unit which is releasably locked to a fluid reservoir container.

A further object of the invention is to provide a fluid dispensing unit with a collapsible and expandable pump operable to withdraw a predetermined amount of fluid from an associated container.

Still another object of the invention is to provide a fluid dispensing unit with pump means and a fluid chamber for storing a predetermined quantity of fluid.

An additional object of the invention is to provide a portable and compact fluid dispensing unit which is simple and rugged in construction, economical to manufacture, and reliable and efficient in use.

The exact nature of the invention as well as other objects and advantages thereof will be readily apparent from the consideration of the following specification relating to the annexed drawing in which:

FIG. 1 is a perspective view of the fluid dispensing unit of the invention in assembled relationship with a fluid container;

FIG. 2 is an enlarged sectional view of the fluid dispensing unit and container assembly taken along the line 2—2 of FIG. 1;

FIG. 3 is a sectional view taken along the line 3—3 of FIG. 2; and

FIG. 4 is an enlarged sectional view of the fluid dispensing unit in the fluid dispensing position.

Referring to the drawing, there is shown in FIG. 1 the fluid dispenser and container assembly of the invention indicated generally by the numeral 10. The assembly 10 comprises a frusto-conical container 11 forming a reservoir for fluid, such as a liquid windshield washing solvent, The dispensing unit 12 is releasably connected to the container 11 and forms a closure member therefor. A U-shaped handle 13 is integrally formed with the top of the dispensing unit 12 and provides a readily accessible hand grip when releasably attached to container, which enables a person to carry the assembly 10 to a desired location.

As shown in FIG. 2, the container 11 is formed from plastic material, such as polyethylene, and has a bottom wall 14, and side walls 16 which converge upwardly in a uniform taper and terminate in an annular lip 17 which defines a circular opening 18 which extends into the interior of the container.

The dispensing unit 12 comprises a hollow body member 19 having a pump section 21 and a chamber section 22 separated by a neck section 23. The pump section 21 is in the form of a bellows having resilient accordion folded side walls 24 and a convex top wall 26. The handle 13 is secured to the top surface of the top wall 26 and is used to apply manual force along the longitudinal axis of the pump section to expand and contract the side walls 24.

The bottom wall 27 of the pump section 21 is in surface engagement with the annular lip 17 of the container 11. A plurality of ears 28 are integrally formed on the chamber section 22 adjacent the neck section 23. The ears 28 project laterally outward and are spaced from the bottom wall 27 a distance slightly less than the thickness of the annular lip 17. When the dispensing unit 12 is positioned in the container 11 and locked thereto the annular lip 17 is clamped between the bottom wall 27 and the ears 28 to seal the opening 18 into the container.

As shown in FIG. 3, the annular lip 17 contains circumferentially spaced notches 29 which correspond in size and shape to the ears 28. Formed integrally with the side walls 16 and annular lip 17 and positioned adjacent one side of the notches 29 are stops 31 which form guides and stops for the ears 28.

In order to interlock the dispensing unit 12 on the container 11 the chamber section 22 is inserted through the circular opening 18 and the ears 28 are aligned with the notches 29 and moved therethrough. The dispensing unit 12 is rotated until the ears 28 engage the stops 31 to effect a clamping action on the annular lip 17.

As shown in FIGS. 2 and 4, the bottom end 32 of the chamber section 22 is formed with a longitudinal extension 33 having a bore 34. A longitudinally projected brass tube 36 is slidably mounted in the bore 34. The upper end of the tube 36 extends into the reservoir chamber 37 and has a flared end 38. The bottom wall 32 is provided with a countersunk recess 39 which is complementary in shape to the flared end 38. An O-ring 41 is positioned around the tube 36 and held in engagement with the end of the longitudinal extension 33 by means of a lock nut 42 which is threaded on the extension 33. The nut 42 has a downwardly directed section 43 which defines a passage 44 for guiding the tube 36. The O-ring 41 is held in frictional engagement with the outer surface of the tube 36 to form a seal with the sliding tube 36. A plastic tube 46 is fastened to the end of the tube 36 and as shown in FIG. 2 limits the upward movement of the tube 36 into the chamber 37.

In use, the dispenser unit 12 is connected to the container 11 with the tube 36 moved up into the reservoir chamber 37 until the plastic tube 46 engages the section 43 in the nut 42 (FIG. 2). The distance that the tube extends into the chamber 37 determines the volume of fluid retained in the chamber. In actual use the upper end of the tube 36 is positioned adjacent the bottom wall 27 of the pump section 21. The volume of dispensed fluid may be regulated by changing the vertical position of the upper end of the tube 36 with respect to the bottom wall 32 by changing the position of the plastic tube 46 on the tube 36.

When the pump unit 12 is positioned on the annular lip 17 of the container 11 the plastic tube 46 extends into the fluid 47 stored in the container. The application of a downwardly directed force on the U-shaped handle 13 collapses the bellows pump section 21 and forces the air within the hollow body member 19 through the tube 36 and plastic tube 46 into the container 11. When the downwardly directed pressure on the bellows pump section is released, the accordion folded side walls 24 expand back to their normal shape. An upwardly directed force from the handle 13 increases the speed of the expansion action of the side walls 24. The expansion of the bellows pump section 21 increases the volume of the hollow chamber formed by the body member 19 thereby reducing the pressure in the chamber. This reduced pressure causes the fluid 47 in the container 11 to flow through the plastic tube 46 and the tube 36 into the reservoir chamber 37 to a level formed by the chamber section 22 of the dispensing unit 12 to a predetermined level. In the event that the pumping action does not fill the chamber to the desired level the pumping action of the bellows-type pump section 21 is repeated until the reservoir chamber 37 contains the desired amount of fluid.

The dispensing unit 12 is removed from the container 11 by rotating the unit until the ears 28 are in alignment with the notches 29. This alignment is established by guide surfaces 48 on the stops 31 which are in alignment with one side wall of the notches 29. See FIG. 3.

To discharge the measured fluid from the reservoir chamber 37, the tube 36 is moved longitudinally downward until the flared end 38 is seated in the countersunk recess 39 (FIG. 4). The application of a downwardly directed force on the bellows pump section 21 collapses the pump section to force the fluid in the chamber 37 through the tubes 36 and 46. After the chamber 37 has been emptied the tube 36 is moved back up into the hollow body 19 until the plastic tube 46 abuts the section 43 of the lock nut 42. The dispensing unit 12 is ready to be placed on and locked to the container 11 and is in a condition to perform a subsequent dispensing operation.

While there have been shown, described, and pointed out the fundamental novel features of the invention as applied to the preferred embodiment, it is to be understood that various omissions, substitutions, changes in form, details of the fluid container and dispenser assembly illustrated may be made by those skilled in the art, without departing from the spirit of the invention. It is intended to be limited only as indicated by the scope of the following claims.

I claim:

1. A fluid dispensing unit for withdrawing fluid from an associated container and for discharging a predetermined volume of fluid comprising:
   (a) a hollow body member having an expandable pump section and a chamber section for storing fluid, said chamber section having a side wall integrally joined with said pump section and extended along the longitudinal axis thereof and a bottom wall provided with a longitudinal extension formed with a longitudinal bore,
   (b) tube means slidably positioned in and extended through said longitudinal bore, one end of said tube means opening into said chamber section and spaced from the side wall thereof,
   (c) means for guiding said tube means for longitudinal movement in said bore, and
   (d) means secured to said tube means and cooperating with said guide means for limiting the longitudinal movement of said tube means into the chamber section thereby regulating the volumetric capacity of said chamber section.

2. A fluid dispensing unit for discharging a predetermined volume of fluid comprising:
   (a) a hollow body member having a collapsible and expandable pump section and a chamber section for storing fluid, said chamber section having a side wall secured to said pump section and extended along the longitudinal axis thereof and a wall provided with a longitudinal extension containing a longitudinal bore,
   (b) tube means slidably mounted in and extended through said bore, one end of said tube means positioned in said chamber section and spaced from the side wall thereof, and
   (c) means operatively associated with said tube means for limiting the longitudinal movement thereof into said chamber section thereby regulating the volumetric capacity of said chamber section.

3. A fluid dispensing unit for discharging a predetermined volume of fluid comprising:
   (a) a body member having a collapsible and expandable pump section and a chamber section for storing fluid, said chamber section being an integral extension of said pump section along the longitudinal axis thereof and having a bottom wall formed with a longitudinal bore,
   (b) tube means slidably positioned in and extended through said longitudinal bore, one end of said tube means opening into said chamber section, and
   (c) means secured to the other end of said tube means for limiting the longitudinal movement of said tube means into the chamber section thereby regulating the volumetric capacity of said chamber section.

4. A fluid dispensing unit for discharging a predetermined volume of fluid comprising:
   (a) a fluid chamber including a side wall and a bottom wall having a bore,
   (b) a bellows pump connected to the side wall of said fluid chamber, said pump being operative to draw fluid into and discharge fluid from said chamber, and
   (c) tube means slidably positioned in the bore in the bottom wall, one end of said tube means projected into said chamber and spaced from the side wall, said tube means being movable relative to said bottom wall of said fluid chamber to regulate the volumetric capacity thereof.

5. A fluid dispensing unit comprising:
   (a) a hollow body member having a collapsible and expandable pump section and a chamber section including a side wall adapted to store fluid,
   (b) tube means slidably mounted on the body member for movement between an in and out position relative to said chamber section, said tube means having a portion thereof longitudinally extended into said chamber in a spaced relation with respect to the side wall thereof, when fluid is to be stored in said chamber, and movable out of said chamber, whereby upon the collapsing of said pump section the stored fluid in the chamber section is discharged through the tube means.

References Cited in the file of this patent

UNITED STATES PATENTS

| | | |
|---|---|---|
| 1,263,453 | Medley | Apr. 23, 1918 |
| 1,447,790 | Kovacs | Mar. 6, 1923 |
| 1,998,901 | Massa | Apr. 23, 1935 |
| 2,760,692 | Buehlig | Aug. 28, 1956 |
| 2,845,963 | Zackheim | Aug. 5, 1958 |
| 3,095,009 | Conley | June 25, 1963 |